Figure 1:
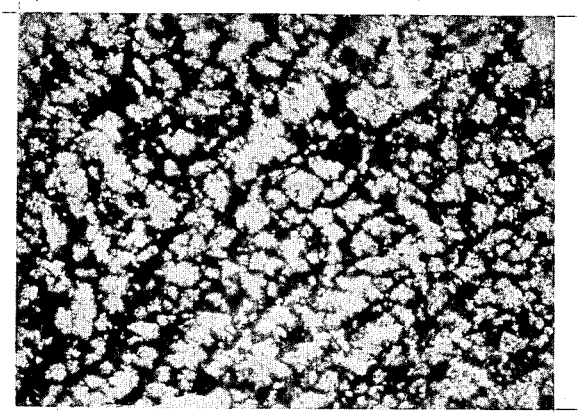

United States Patent [19]

Mochizuki et al.

[11] 4,177,296

[45] Dec. 4, 1979

[54] PROCESS FOR THE PREPARATION OF PEANUT-CURD

[75] Inventors: Keizo Mochizuki; Iwao Hachiya, both of Kawasaki, Japan

[73] Assignee: Meiji Seika Co., Ltd., Tokyo, Japan

[21] Appl. No.: 925,240

[22] Filed: Jul. 17, 1978

[51] Int. Cl.² ............................ A23L 1/01; A23L 1/20
[52] U.S. Cl. .................................... 426/632; 426/385; 426/444; 426/453; 426/464; 426/468; 426/469; 426/472; 426/473
[58] Field of Search ............... 426/285, 548, 573, 632, 426/658, 384, 385, 444, 453, 456, 460, 464, 466, 468, 469, 472, 473, 482, 483, 489, 507, 512, 515, 518, 520, 524, 629, 634, 656, 802, 633

[56] References Cited

U.S. PATENT DOCUMENTS

| | | | |
|---|---|---|---|
| 1,696,766 | 12/1928 | Howe | 426/633 |
| 4,113,889 | 9/1978 | Baxley | 426/632 X |
| 4,117,174 | 9/1978 | Tonouchi et al. | 426/634 |

FOREIGN PATENT DOCUMENTS 32-8676 of 1957 Japan.

OTHER PUBLICATIONS

Altschul, *New Protein Foods*, pp. 420 & 422, Gp 170.

*Primary Examiner*—Arthur L. Corbin
*Attorney, Agent, or Firm*—Hammond & Littell

[57] ABSTRACT

A process for the preparation of peanut-curd with a roasted taste and flavor, which comprises roasting peanuts, pressing the roasted peanuts to partially remove oil therefrom, pulverizing the pressed peanuts at a temperature at or below −40° C., dissolving the pulverized peanuts in water, boiling the resultant mixture, cooling the mixture and adding a coagulant to the mixture to solidify the mixture to obtain peanut-curd.

10 Claims, 2 Drawing Figures

PROCESS FOR THE PREPARATION OF PEANUT-CURD

The present invention relates to a process for the preparation of bean-curd or "Tofu" and more particularly peanut-curd with a desirable roasted taste and flavor.

In general, peanut-curd has been prepared by obtaining a peanut milk in a manner similar to that of soy bean milk, but adding thereto a starchy substance, a powder of Konjak (*Amorphophallus konjac*), agar or the like, to increase the rigidity of gel and cooling the resulting material to solidify the same. However, those curds have an undesirable roasted taste and flavor.

For giving a roasted taste and flavor to the peanut-curd, a certain roast of raw peanuts is required but it has been so considered thaat such thermal treatment of "roast" would cause a thermal denaturation of peanut protein to lose the rigidity of gel thereof. Hitherto, there has been proposed no practical process for the preparation of peanut-curd with a desirable roasted taste and flavor, excepting a process as disclosed in Jap. Pat. Publn. No. 8 676/1957 entitled "A process for the Preparation of Peanut-Curds and Frozen and Dried-Frozen Peanut-Curds". According to this known process, peanut-curd with a weal roasted taste and flavor has been prepared by soaking raw peanuts with the testa (red skin) in water for 2.5 to 3.0 hours, deskinning and washing the soaked green peanuts in water to remove the red skins and harshness, drying and roasting under heating the peanuts at about 150° C, pulverizing the peanuts to obtain peanut powder, squeezing the peanut powder in water by use of a filter bag preferably made of cotton to obtain a filtrated liquid, i.e., peanut milk and then adding a calcium compound as coagulant into the peanut milk after heating it to a temprature from 60° C. to80° C. to gain peanut-curd. This known process has disadvantages in that it is impossible to obtain the peanut-curd with a desirable roasted taste and flavor, as roasted flavor and taste components are taken off by steam during the drying and roasting stage. Also, it is impossible to prevent the accompanying formation of so-calledbean-curd residue (okara). Furthermore, since the resulting peanut-curd has a lowered rigidity of gel due to the face that denaturation of the peanut protein occurs at 150° C., molding or casting of the peanut curd should be done in the same manner as molding of the usual soybean-curd into "Momen Tofu".

Therefore, an object of the present invention is to provide a process for the preparation of Tofu-like peanut-curd with a desirable roasted taste and flavor.

Another object of the present invention is to provide a process for the preparation of Tofu-like peanut-curd with a sufficiently high rigidity of gel in addition to a desirable roasted taste and flavor.

A further object of the pesent invention is to provide a process for the preparation of peanut-curd with a desirable roasted taste and flavor, which process produces no peanut-milk residue.

Another object of the present invention is to provide freeze-dried peanut-curd which can easily be reconstituted with cold or hot water to the original Tofu-like peanut-curd which has a desirable roasted taste and flavor.

Still another object of the present invention is to provide sweetened Tofu-like peanut-curd with a desirable roasted taste and flavor.

According to the present invention, the abovementioned objects can be attained with several advantages by a process for the preparation of Tofu-like peanut-curd, which comprises the steps of roasting raw peanuts with the testa (red skin) for 60 to 15 minutes, preferably for 60 to 20 minutes, at a temperature from 110° C. to 120° C., removing the testa (red skin) in a conventional manner, pressing the deskinned peanuts to partially remove oil content therein, pulverizing the pressed peanuts to about 325 mesh (ASTM) at a temperature below $-40°$ C., adding water thereto at a temperature of from 5° C. to 50° C., boiling the resulting mixture for 1 to 5 minutes, cooling the mixture to 70° to 80° C., adding therein a coagulant to solidify the same to obtain the Tofu-like peanut-curd and then, if necessary, freeze drying the curds in a conventional manner.

When the roasting temperature is set at 110° C., it is preferable to set the roasting time from 60 to 30 minutes and more preferably from 60 to 40 minutes, because if the roasting time is less or over the time range mentioned, the finished peanut-curd has too weak or undesirably over roasted taste and flavor. For a similar reason, it is peferable to set the roasting time from 30 to 15 minutes and more preferably 30 to 20 minutes, when the roasting temperature is set at 120° C. It is impossible to obtain peanut-curd with a sufficiently high rigidity of gel under a roasting temperature above 120° C., namely 25 minutes at 125° C., 15 minutes at 130° C. or 10 minutes at 140° C., as set forth in the subsequent Table.

The removal of the testa (red skin) of each roasted peanut may be carried out in a conventional manner, for instance with use of ribbed-rubber rolls and a blower or aspirator. The roasted peanuts, free from the testa (red skin), are then pressed to remove oil content corresponding to an amount of from 10 to 30% based on the weight of the roasted peanuts. If the oil content is removed in an amount of more than 30%, a smooth mouth feel would be lost in the finished Tofu-like peanut-curd, and if the oil content is removed in an amount of less than 10%, a sufficiently high rigidity of gel of the curd cannot be attained.

The pulverization is carried out at a temperature of $-40°$ C. or below, that is usually at a temperature ranging from $-40°$ C. to $-100°$ C., in a manner such that there is no oil separation and 60% or more of the pulverized particles are capable of passing through a 325 mesh (ASTM) sieve.

When less than 60% of the pulverized particles can pass through 325mesh (ASTM) sieve, the resulting Tofu-like peanut-curd lacks smooth mouth feel. The pulverized peanuts are dissolved by adding thereto water in an amount of from 5 to 8.5 times and more preferably 6 to 7 times based on weight of the pulverized peanuts. In either case, when water less than 5 times or more than 8.5 times is added, the peanut-curd with a sufficiently high rigidity of gel cannot be obtained, because in the former case the cohesive power of the peanut protein will become lower due to an extremely high viscosity of the peanut solution and in the latter case the concentration of the peanut solution will become too low.

The peanut solution shall be heated to boil for 1 to 5 minutes followed by cooling to 70°~80° C. In this case, it is preferable to set the boiling time to 1 to 2 minutes, since if the boiling shall be continued in excess, the rigidity of gel of the finished Tofu-like peanut-curd would become lower.

Glucono-δ-lactone, calcium sulphate, calcium chloride and the like may be employed as the coagulant. After the coagulant has been added, the solution may be poured into molds or cups and allowed to stand for 30 minutes or more at room temperature to effect the solidification thereof to obtain the Tofu-like peanut-curd with a desirable roasted taste and flavor.

The Tofu-like peanut-curd thus obtained has a desirable roasted taste and flavor as well as a sufficiently high rigidity of gel. The rigidity is higher than that of the Tofu-like peanut-curd obtained from raw peanut powder pulverized at a temperature of −40° C. or below and than that of the peanut-curd formed from peanut milk obtained by using a cotton filter bag from roasted peanuts roasted at a temperature ranging from 110° C. to 120° C. According to the present invention, peanut-curd is prepared only by dissolving the partially defatted peanut powder, which is obtained by pulverizing peanuts at a temprature of −40° C. or below, in water, and no peanut-milk residue (okara) is produced. And the conventional process for the production of peanut milk by using a cotton filter bag is completely eliminated.

The obtained Tofu-like peanut-curd may be freeze-dried for preservation under a far slower, freezing condition than any conventional soybean-curd, and denaturation of the peanut-curd does not occur. For instance, the freezing step of the peanut-curd can be carried out at a temprature ranging from about −30° C. to about −5° C. for 20 to 120 minutes. this means that the freeze-drying of the peanut-curd according to the present invention can be carried out by use of a freeze-dryer with a slow freezing unit which is cheaper and requires low energy cost. In this connection, it should be noted that the conventional freeze-drying of soybean-curd requires a quicker freezing, such as freezing at −70° C. for within 5 minutes.

The freeze-dried Tofu-like peanut-curd obtained according to the present invention can quickly and easily be reconstituted to the original peanut-curd with a sufficiently high rigidity of gel and a desirable roasted taste and flavor by soaking the same in either cold or hot water.

According to the procedure for dispersing and dissolving the pulverized peanut in water, employed in the present invention, peanut-curd with a sweet taste can be obtained by the addition of sucrose, glucose, fructose, sorbitol, saccharin or the like. The sweetener, except saccharin, is added in an amount of 0.1 to 2.0 parts and, more preferably 0.5 to 1.0 part by weight per part of pulverized peanuts. When sweeteners are added in amounts of less than 0.1 parts, the Tofu-like peanut-curd thus obtained is insufficiently sweetened. When sweeteners are added in amounts of more than 2 parts, the Tofu-like peanut-curd thus obtained has a low rigidity and a poor texture. Thus, Tofu-like peanut-curd with a sufficiently high rigidity and a good texture is obtained when sweeteners in an amount of 0.5 to 1.0 part by weight are added per part of the pulverized peanuts. In case the sweetner is saccharin, this sweetener should be added in an amount of 0.5 to 1.0 part by weight per 400 parts of the pulverized peanuts.

The pulverized peanuts containing the sweeteners in an amount mentioned above is dissolved and dispersed by adding thereto water in an amount of 5.0 to 8.5 parts and more preferably 6 to 7.5 parts per part of pulverized peanuts by weight. The obtained mixture is heated to boil for 1 to 5 minutes and more preferably for 1 to 2 minutes. After cooling down to 70°∼80° C. a known coagulant, such as glucono-δ-lactone, calcium sulfate, calcium chloride and the like, is added to the mixture and the mixture poured into a mold or cup and allowed to stand for 30 minutes or more at room temperature to solidify. the sweetened Tofu-like peanut-curd thus obtained has a desirable roasted taste and flavor.

The present invention will be further explained by the following Examples, in comparison with some comparative Samples.

Example 1 (1) to (3)

Raw peanuts were charged in a rotary wire-netted drum type roaster and roasted for 60 (Example 1 (1)), 40 (Example 1 (2)) and 30 (Example 1 (3)) minutes, wherein the temperature of hot air had been adjusted so as to heat the peanuts at 110° C.

After having been roasted, the roasted peanuts were treated by ribbed-rubber rolls and a blower or an aspirator to remove the testa (red skin), and deskinned peanuts were pressed by a hydraulic press to remove 30 parts by weight of oil content per 100 parts by weight of the roasted peanuts. The roasted and partially defatted peanuts (70 parts by weight) were then treated by a hammer mill at −70° C. to obtain peanut powder, 60% or more of which passes through a 325 mesh (ASTM) sieve. 180 parts by weight of water at 20° C. was added to 30 parts by weight of peanut powder, and then the mixture was stirred for 10 minutes to homogeneously disperse and dissolve the powder. The mixture was heated to boil for 1 minute and then cooled to 70° C. To the cooled mixture 0.72 parts by weight of glucono-δ-lactone was added and the mixture poured into a mold (12 cm × 12 cm × 16 cm) and allowed to stand for 1 hour at room temperature and cut to pieces to obtain 200 parts by weight of the Tofu-like peanut-curd with a desirable roasted taste and flavor (see also the Table hereinafter).

Example 2 (1) to (3)

Raw peanuts were charged in and roasted for 30 (Example 2 (1)), 20 (Example 2 (2)) and 15 (Example 2 (3)) minutes by a rotary wire-netted drum type roaster, wherein the temperature of hot air had been adjusted so as to heat the peanuts at 120° C. The roasted peanuts were deskinned and pulverized in a manner similar to that as stated in Example 1 to obtain a corresponding peanut powder.

210 parts by weight of water at 30° C. was added to the peanut powder (30 parts by weight), and the mixture was stirred for 10 minutes to homogeneously disperse and dissolve the powder. The mixture was heated to boil for 2 minutes and then cooled to 80° C. to the mixture 0.8 parts by weight of calcium sulphate was added, and the mixture was poured into a mold (12 cm × 12 cm × 16 cm) and allowed to stand for 30 minutes at room temperature and cut to pieces to obtain 200 parts by weight of the Tofu-like peanut-curd with a desirable or fairly desirable roasted tast and flavor (see also the Table).

Comparative Samples 1 to 5

5 tests were carried out by use of a process similar to that as stated in Example 1 or 2, and by varying roasting conditions or without roasting the raw peanuts (Comp. Sample 1). Results are shown in the Table.

Comparative Sample 6

Raw peanuts were roasted under conditions as stated in Example 2, namely at 120° C. for 30 minutes. The roasted peanuts were pulverized and made into the peanut-curd using peanut milk, in accordance with a conventional process. Results are shown in the Table.

TABLE

|  | Roasting conditions | | *The | |
| --- | --- | --- | --- | --- |
|  | temp. (°C.) | time (min.) | rigidity of gel | Roasted taste and flavor |
| Example 1 (1) | 110 | 60 | 81.0 | desirable |
| 1 (2) | 110 | 40 | 74.0 | desirable |
| 1 (3) | 110 | 30 | 53.0 | fairly desirable |
| 2 (1) | 120 | 30 | 81.5 | desirable |
| 2 (2) | 120 | 20 | 72.0 | desirable |
| 2 (3) | 120 | 15 | 55.0 | fairly desirable |
| Comp. Sample 1 | — | — | 43 | none |
| 2 | 100 | 60 | 45 | none |
| 3 | 125 | 25 | 0 | somewhat excess |
| 4 | 130 | 15 | 15 | excess |
| 5 | 140 | 10 | 0 | excess |
| 6 | 120 | 30 | 0 | too weak |

*The rigidity of gel was determined by use of a curd tension meter (made by Iio Electric Co., Ltd. of Japan)
Needle: 5 mm (diameter)
Weight: 100 g
Sample Size: 3cm (length) × 3cm (width) × 2cm (depth) Ascending speed of sample holding stage: 0.36 cm/sec.

The rigidity of gel is shown in terms of the maximum one.

As shown in the Table, a roasting for from 60 to 15 minutes at a temperature from 110° to 120° C. gives a desirable roasted taste and flavor excepting the cases of Comparative Sample 6 made by roasting for 30 minutes at 120° C. and a conventional process using peanut milk. A Sample made by roasting for 15 minutes at 120° C. (Example 2 (3)) gives a fairly desirable roasted taste and flavor, but Comparative Samples 3-5 made by roasting at a temperature above 125° C. gives an excessively roasted (over-roasted) taste and flavor.

On the other hand, no roasted taste and flavor occurs in Comparative Sample 2 made by roasting at 100° C. for 60 minutes, and the peanut-curd Tofu-like made from roasted peanuts roasted for 30 minutes at 120° C. through peanut milk in accordance with a conventional process (Comparative Sample 6) gives too weak of a roasted taste and flavor. By roasting for from 60 to 20 minutes at a temperature of 110°~120° C., the Tofu-like peanut-curd is obtained with the rigidity of gel within the highest range and with the desirable mouth feel of a good elastic gel which is a feature of Tofu-like peanut-curd of fine quality. And by roasting for 15 minutes at 120° C. or for 30 minutes 110° C., the Tofu-like peanut-curd is obtained with fairly high (55.0, 53.0 respectively) rigidity of gel and with the mouth feel of a fairly good elastic gel.

However, by roasting for 60 minutes at 100° C. (Comp. Sample 2) without roasting (Comp. Sample 1) the rigidity of gel is relatively low (43) and the gel is slightly loose and tends to collapse. Also by roasting for 15 minutes at 130° C. (Comp. Sample 4), the rigidity of gel is low (15) and the gel is loose and tends to collapse.

Further, by roasting for 30 minutes at 120° C. (Comp. Sample 6), and for 25 minutes at 125° C. (Comp. Sample 3), and for 10 minutes at 140° C. (Comp. Sample 5), the finished Tofu-like peanut-curd does not gel but merely forms a slurry.

Example 3

The peanut-curd obtained by the process as stated in Example 1 was cut into cubic fragments, each fragment having a size of 1 (length) × 1 (width) × 1 (depth) cm. The cubic curd was frozen over 30 minutes in a thermostatically refrigerated chamber at −20° C., and then dried using a freeze-drier to obtain freeze-dried Tofu-like peanut-curd. The curd had a property of rapidly reconstituting the original curd texture by soaking the same in cold or hot water.

Figure 2:
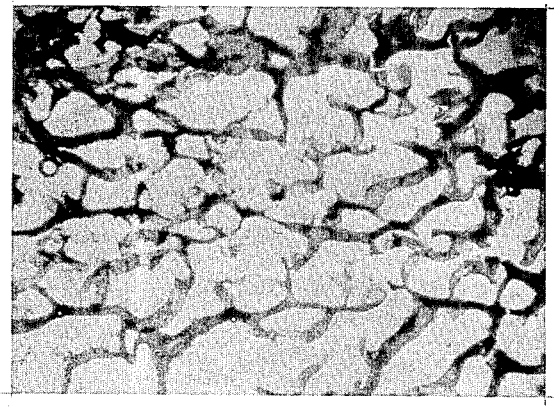

The freeze-dried Tofu-like peanut-curd, as shown in FIG. 1 (40×), had a more finely grained structure in comparison with a freeze-dried soybean curd (Tori-dofu) pepared in the conventional manner using soybean milk; as shown in FIG. 2 (40×), the former giving far better smooth mouth feel than the latter.

Example 4

50 parts by weight of sucrose was added to 50 parts by weight of peanut powder obtained by the press as stated in Example 1, and 370 parts by weight of water at 20° C. was added, and then the mixture was stirred for 10 minutes to homogeneously disperse and dissolve the powder. After boiling the mixture thus obtained for 1 minute, and cooling down to 70° C., 1.2 parts by weight of glucono- δ-lactone was added to the cooled mixture and kept to stand in molds for 1 hours at room temperature to obtain 470 parts by weight of sweetened Tofu-like peanut-curd with a desirable roasted taste and flavor.

Example 5

0.1 part by weight of saccharin and 290 parts by weight of water at 20° C. were added to 50 parts by weight of peanut powder obtained by the process as stated in Example 1. By treating the thus obtained mixture as stated in Example 4, 330 parts by weight of the sweetened Tofu-like peanut-curd with a desirable roasted taste and flavor were obtained.

What is claimed is:

1. A process for the preparation of peanut-curd, which comprises the steps of roasting raw peanuts with the red skin intact for 60 to 15 minutes at a temperature of from 110° C. to 120° C., removing the red skin pressing the deskinned peanuts to partially remove peanut oil therefrom in an amount of from 10 to 30% by weight of the roasted peanuts, pulverizing the pressed peanuts to about 325 mesh (ASTM) at a temperature of −40° C. or below, dissolving the pulverized peanuts in from 5 to 8.5 parts by weight of water per part of pulverized peanuts, the water being at a temperature ranging from 5° C. to 50° C., boiling the resulting mixture for 1 to 5 minutes, cooling the mixture to 70° C. to 80° C., and adding thereto a coagulant to solidify the cooled mixtureand thereby obtain peanut-curd.

2. A process as claimed in claim 1, wherein the raw peanuts are roasted at 110° C. for 30 to 60 minutes.

3. A process as claimed in claim 1, wherein the raw peanuts are roasted at 120° C. for 15 to 30 minutes.

4. A process as claimed in claim 1, wherein the pulverizing is carried out at a temperature from −40° C. to 100° C.

5. A process as claimed in claim 1, further comprising the step of freeze-drying the peanut-curd for preservation to obtain freeze-dried peanut-curd.

6. A process as claimed in claim 1, further comprising the step of adding to the pulverized pressed peanuts from 0.1 to 2 parts by weight of a sweetener per part of pulverized pressed peanuts, said sweetener being selected from the group consisting of sucrose, glucose, fructose and sorbitol.

7. A process as claimed in claim 6, wherein from 0.5 to 1.0 part of sweetener per part of the pulverized pressed peanuts are added to the pulverized pressed peanuts.

8. A process as claimed in claim 1, further comprising the step of adding to the pulverized pressed peanuts saccharin in an amount of from 0.5 to 1.0 part by weight per 400 parts of pulverized pressed peanuts.

9. A process as claimed in claim 1, wherein the pulverizing of the pressed peanuts is carried out in a manner such that 60% or more by weight of pulverized peanuts will pass through a 325 mesh (ASTM) sieve.

10. A process as claimed in claim 1, wherein the raw peanuts are roasted for 60 to 20 minutes.

* * * * *